May 16, 1961 R. B. WHITE 2,984,387
CONTINUOUS TIME-RATE CONTROLLER
Filed Sept. 10, 1957 3 Sheets-Sheet 1
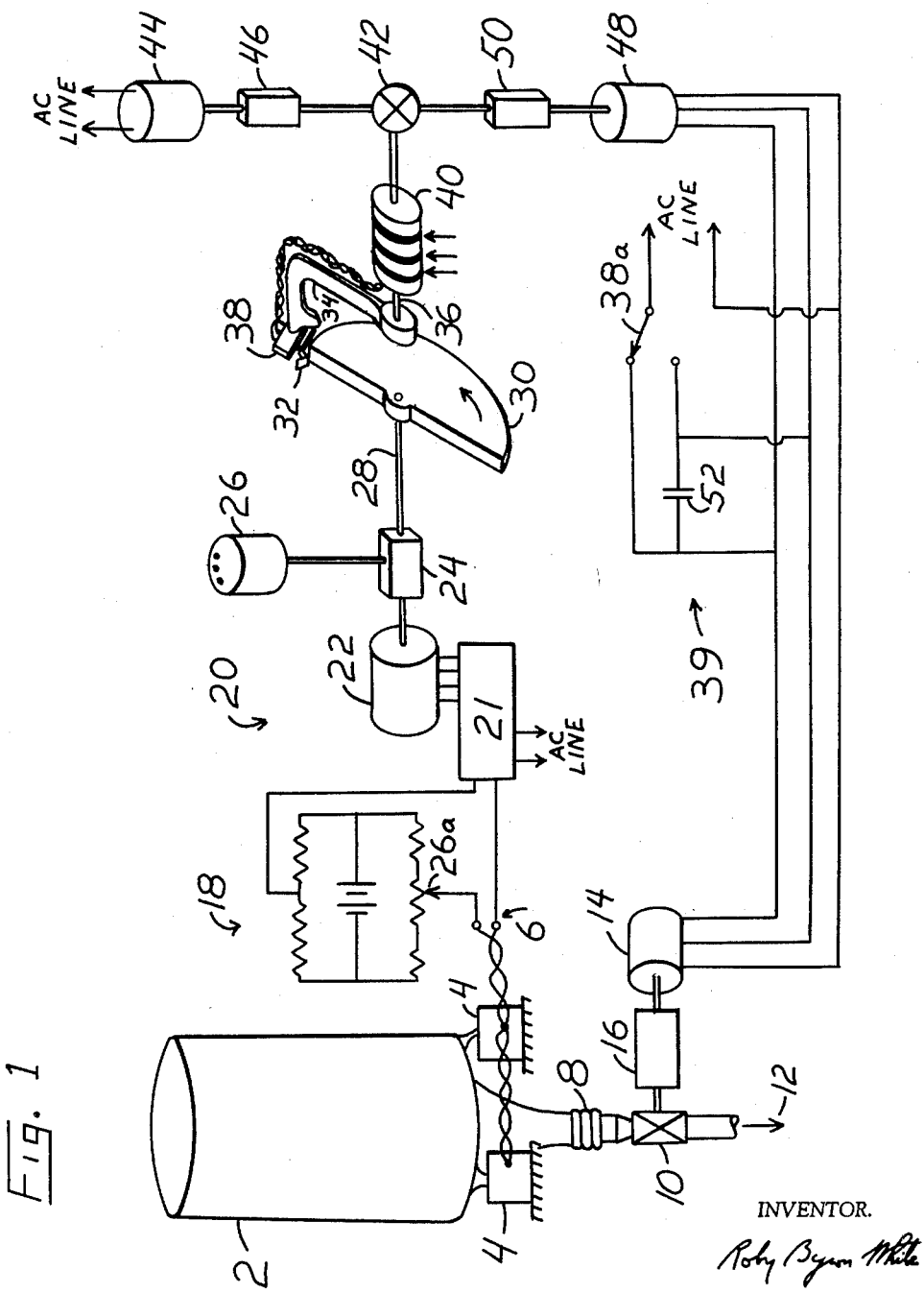
INVENTOR.
Roby Byron White

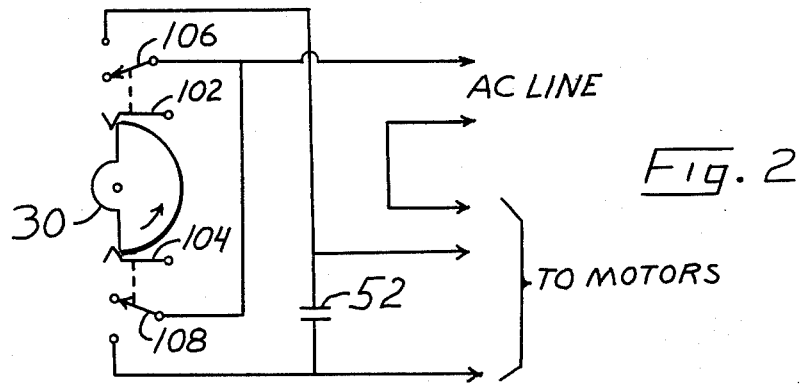
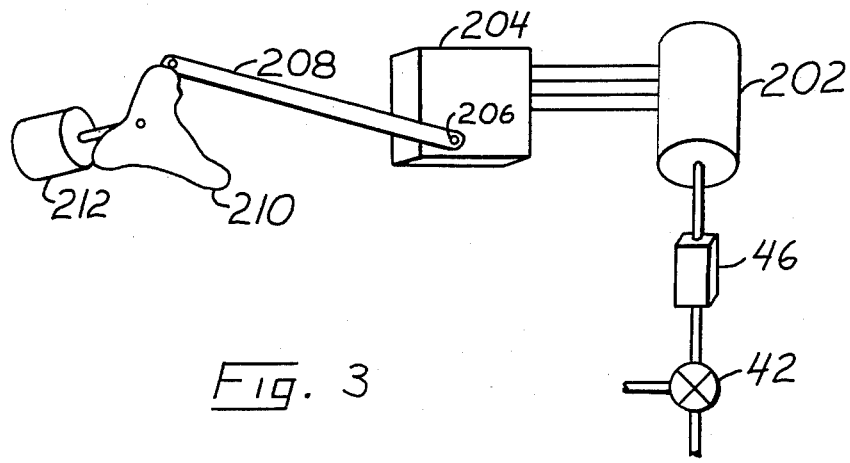

May 16, 1961 R. B. WHITE 2,984,387
CONTINUOUS TIME-RATE CONTROLLER
Filed Sept. 10, 1957 3 Sheets-Sheet 3

INVENTOR.
Roby Byron White

United States Patent Office 2,984,387
Patented May 16, 1961

2,984,387

CONTINUOUS TIME-RATE CONTROLLER

Roby Byron White, 381 N. Main St., Sharon, Mass.

Filed Sept. 10, 1957, Ser. No. 683,162

6 Claims. (Cl. 222—58)

The present invention relates to controllers and control methods and in particular to controllers capable of maintaining a constant rate-of-change and a variable rate-of-change of a controlled variable with respect to time.

An object of this invention is to provide a controller capable of maintaining variations of a parameter in a system or process at a constant known rate with respect to time. Dimensions of control might be inches per second, pounds per minute, etc.

Another object of this invention is to provide a generalized method of controlling a process by virtue of being able to control, for example, the rate of material addition as a function of time.

Another object of this invention is to provide a controller capable of maintaining a time-programmed change in the rate-of-change with respect to time of a parameter in a system or process, thus providing second derivative control of that parameter.

Further objects and advantages of this invention as well as its arrangement, construction and operation will be apparent from the following description and claims in connection with the accompanying drawings in which:

Fig. 1 is a view, partially diagrammatic and partially schematic of one form of this invention;

Fig. 2 illustrates a modification of a portion of the invention illustrated in Fig. 1, Fig. 3 is a diagrammatic view of a modification of a portion of the embodiment of Fig. 1 for accomplishing second derivative control.

In the first three figures identical numbers designate identical parts.

Figure 4:
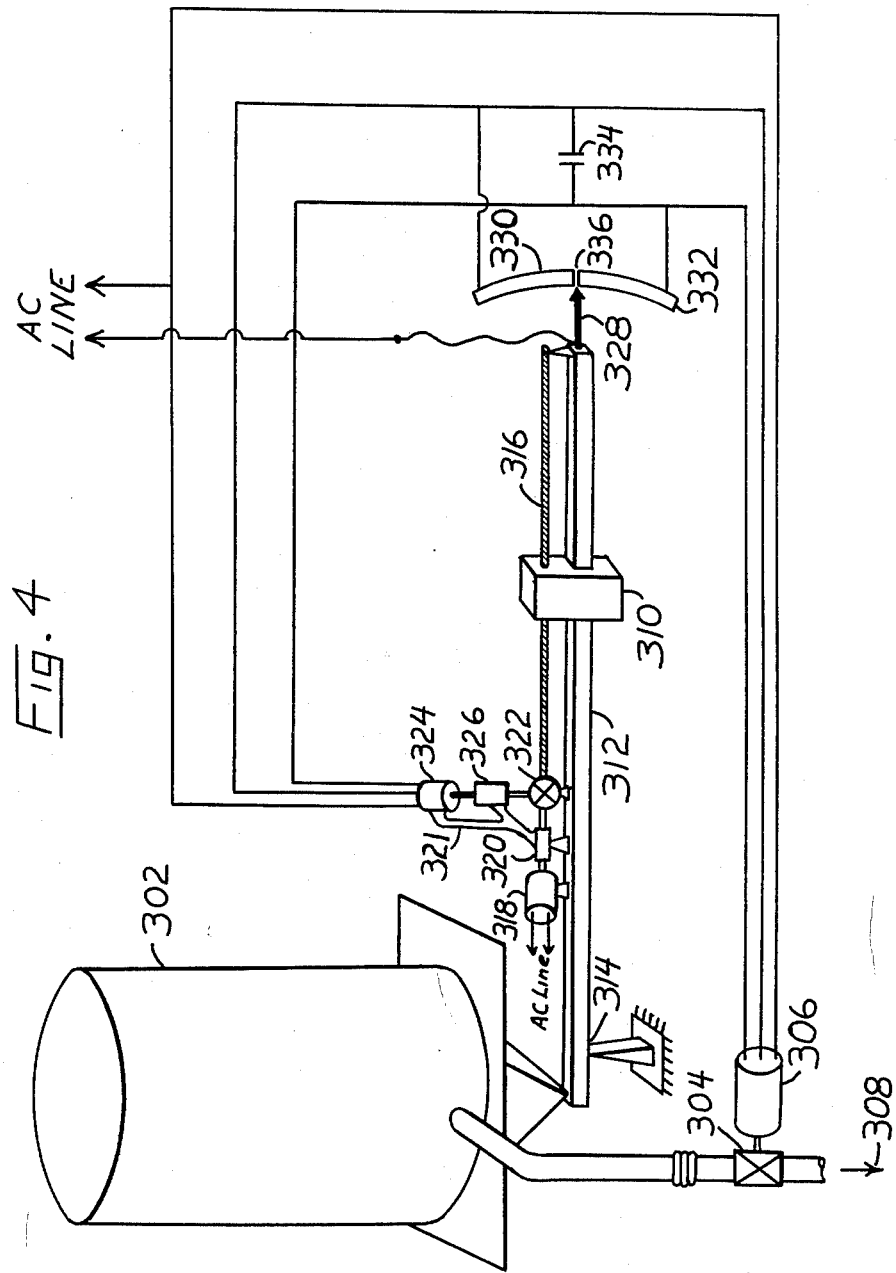
Fig. 4 is a view of an alternative construction of this invention.

The controller of this invention will maintain constant the rate-of-change of a variable with respect to time. This is accomplished by maintaining a continuous analog measurement of the instantaneous value of the variable and pacing this analog with an equivalent which changes at a predetermined constant desired rate. Any deviation between the values of the two analogs is immediately detected and used to make small changes in the control factor which affects the rate-of-change of the variable with respect to time. Where second derivative control is required it is only necessary to time program the velocity of the pacing analog.

In Fig. 1 the controller of this invention is shown so connected as to maintain constant mass flow of liquid from a tank. The mass flow is determined by the mass loss from the tank, and, by maintaining this rate of mass loss constant with respect to time, the mass flow is held constant. The weight of the tank is converted into an analog shaft rotation of many revolutions from full to empty. This shaft rotation is paced by another shaft rotation held constant by a synchronous motor connected to A.C. power lines. Any deviation in the relative angular travel between the two shafts is sensed by a cam and switch arrangement. The deviation is corrected by a reversible motor driving between the synchronous motor and the pacing shaft and at the same time a correction of position is made in the control factor of the liquid from the tank. In this case, the control factor is a motor driven valve in the discharge line. When the liquid mass flow is too low, the cam will not keep up with the angular rotation of the switch; the correcting motor will then slow the switch shaft velocity so that the weight analog shaft can catch-up. This requires a small amount of time and during this time the motor controlling the valve position opens the valve slightly so that the mass flow from the tank will increase and thus slightly increase the angular velocity of the weight analog shaft so that it will keep up with the pacing shaft. Thus the mass-flow is controlled constant independent of pressure, temperature, viscosity, or fluid head. In the embodiment of my invention shown in Fig. 1, the cam-switch is never satisfied and it causes the control factor, the motor driven valve, to continuously hunt for exactly the right setting.

The only change necessary for second-derivative control is to time program the velocity of the pacing shaft. Thus, instead of driving it from a synchronous motor, it may be driven by a speed controlled D.C. motor with the speed control programmed by a rotating cam.

In Fig. 1, the weight of the fluid and the tank 2 is continuously measured by a multiplicity of weigh cells 4 series connected so as to indicate at a pair of terminals 6 the total weight of the tank and fluid contents in the form of an analog voltage. The liquid from the tank is discharged through a flexible connector 8 and the valve 10 as indicated by the arrow 12. The position of the valve 10 is controlled by a two-phase motor 14 driving through a gear train 16.

The electrical analog of the weight at terminals 6 is summed with a voltage produced across a Wheatstone bridge and the sum is fed to a null-balance amplifier servo system 20, which includes amplifier 21, motor 22, and potentiometer 26. The feedback in the system to obtain the null balance is provided by the potentiometer 26 electrically connected at 26a in the Wheatstone bridge 18. The potentiometer 26 may be of the multi-turn type with a helical winding so that there is a greater resistance winding length with consequent increase in resolution and linearity, both being of value in this application. The servo motor 22 drives the potentiometer 26 through a gear train 24 and simultaneously turns an output shaft 28 and a cam 30 carried by the shaft 28 a proportional amount. It is intended that cam 30 will make many revolutions, perhaps a hundred, over the total weight change of the tank 12 from full to empty. For a six inch diameter cam, one-hundred revolutions would give an equivalent comparison scale length of over one-hundred and fifty feet; so it is obvious that a high order of accuracy can be obtained.

In the foregoing description, the weigh cells 4 may typically be of the strain gauge type described in the book "Electric Resistance Strain Gauges" by Dobie and Isaac, page 97. The servo amplifier 20 and associated motor 22 may be any of a large number of types commercially available, many of which are described in the book "Theory of Servomechanisms" by James, Nichols, and Phillips.

A switch 38 and an actuator 32 are carried on an arm 34 secured to a second shaft 36 such that either edge of the cam 30 will actuate the switch 38. The electrical connections from the switch 38 run to a slip ring assembly 40 and thence to the electrical circuit. The shaft 36 is rotated by synchronous motor 44 through a gear train 46 and a differential 42; thus shaft 36 has a basic constant speed of rotation. The speed of rotation of the shaft 36 may be either increased or decreased by a two-phase reversible motor 48 connected through a gear train 50 to the differential 42. It is apparent that the incremental increase or decrease in the velocity of the shaft 36 caused by the motor 48 is in fact a continuous succession of discrete changes whose values are equal to the incremental change in velocity multiplied by the time of application.

The electrical part of switch 38 is indicated at 38a in the circuit 39. A capacitor 52 in the circuit 39 provides the necessary phase shifting for the motors 14 and 48. The polarity of connection is such that if switch 38 is actuated indicating too high a discharge rate from the tank 2, the motor 48 will increase the velocity of the shaft 36, and simultaneously, the motor 14 will slightly close the valve 10 to reduce the discharge rate from the tank 2. At the moment switch 38 is released the opposite occurs, that is, the valve 10 will be opened slightly to increase the rate of discharge. This reversing action will be continuous and the average adjustment of valve 10 will be such that the fluid discharge rate will cause shaft 28 to have the identical angular velocity of shaft 36 for which the average velocity will be constant. Thus the rate of change of weight of the tank with respect to time will be constant and this can only be accomplished by having a constant rate of weight discharge from the tank.

Although either edge of cam 30 will activate the switch 38, only one edge will have the switch properly phased to accomplish the desired purpose. Therefore it is required that the corrective action of motor 48 through gear train 50 be of a sufficient rate to slightly exceed the maximum discharge rate as indicated by the analog rotation of cam 30.

Figure 2 shows an alternative cam and switch arrangement providing a small dead zone so that when the mass flow rate is constant at the desired value, no corrective action is taken. This is accomplished by having the two switches 106 and 108 open for a small range of arc difference in displacement between shafts 28 and 36 of Fig. 1. The switch 106 and 108 are controlled by the actuators 102 and 104 adjacent opposite edges of the cam 30. Under this condition neither switch 106 nor switch 108 makes contact with a motor drive lead and no corrective action is taken. If the shaft 28 driving cam 30 lags behind because of a decrease in mass flow rate, then switch 108 is actuated and corrective action is taken. This arrangement once properly phased with the direction of control has no out of phase position.

Figure 3 shows the required changes to accomplish second derivative control. Motor 44 of Fig. 1 is replaced by a D.C. motor 202 having a variable speed drive control 204 operated by an adjustment shaft 206. This D.C. motor and drive may, for example, operate on the general principles of speed control described in the "Electrical Engineers Handbook," 4th edition, Pender and Del Mar, page 8-46. A cam follower 208 connected to the shaft 206 follows the profile of a typical cam 210 which is rotated by a synchronous motor 212. The rotation of shaft 206 caused by the action of cam 210 on follower 208 is reflected as a change in angular velocity of shaft 36 of Fig. 1 and consequently valve 10 is continuously adjusted to follow the time programmed time-rate-of change as dictated by cam 210. Cam 210 can be cut to give any time change program required. It should be noted that without follower 208, shaft 206 becomes a basic rate-of-change control and can be used for calibration and adjustment purposes.

Referring again to Fig. 1, it should be evident to the reader that the action of the motor 48 acting through the gear train 50 and differential 42 in adding successive increments to the reference analog to make it equal the analog of the variable weight as represented by the rotation of shaft 28 could just as well be placed on the other side of the cam-switch assembly. In such case the differential would be inserted in shaft 28 between the gear train 24 and the cam 30. The function of the motor driving through the differential would then be to add successive increments to the analog of the variable, weight, such as to make the analog as represented at the cam 30 equal the reference analog as represented by the rotation of the shaft 36. The successive changes in the position of the valve 10 as driven by motor 14 then becomes proportional in magnitude and direction to the increments added to the weight analog as represented by the angular position of shaft 28 at the point of exit from gear train 24.

Fig. 4 illustrates the principles of this invention applied to obtain constant rate of weight discharge from a tank on a beam balance scale. The flow of liquid from the tank 302 is controlled by a valve 304 which in turn is adjusted by a reversible motor 306. The discharge from the tank is indicated at 308. The scale is balanced by weight 310 moving along beam 312 with the fulcrum of the scale at 314.

The weight 310 is moved along the beam 312 at a constant rate by the action of the lead screw 316 being driven by the synchronous motor 318 through gear train 320 and differential 322. Thus the weight is paced down the beam at the desired rate of reduction in the weight of the tank with respect to time.

At the end of the beam an electrical contactor 328 determines the state of balance of the scale. If contactor 328 makes contact with the partial slip ring 330 the tank is too heavy and so flow of fluid is too slow. If contact is made with the partial slip ring 332, the flow of fluid is too great. The desired condition is to have the contactor stay in the narrow gap between the slip rings as indicated at 336; this condition indicates that the weight loss from the tank 302 is at the same rate that weight 310 is being paced down beam 312.

If the contactor 328 does make contact with either of the partial slip rings 330 or 332, power is applied to motors 306 and 324; both of these motors are two-phase capacitor motors so that capacitor 334 and partial slip rings 330 or 332 determines in which direction these motors, 306 and 324, will run. These motors are phased such that when contactor 328 is on partial slip ring 330, motor 324 will drive the lead screw 316 through gear train 326 and differential 322 such as to move weight 310 out along beam 312 and bring the beam back to balance. Brace 321 rigidly mounts motor 324 and gear trains 320 and 326 to beam 312.

Simultaneously with motor 324 moving weight 310 to obtain a balance, motor 306 changes valve 304 to obtain a higher rate of flow. If the weight reduction in the tank is still at a lower rate than that required by the pacing of weight 310 the contactor 328 will again move up on the partial slip ring 330 and the valve 304 will be further opened by the action of motor 306.

If the contactor 328 should touch the partial slip ring 332 the inverse action will take place. Thus the control system will act to hold the rate of discharge such that the time rate-of-change of weight of the tank will be identical to that paced by the action of motor 318 moving weight 310 down the beam 312.

The control action of Fig. 4 is identical to that of Fig. 1. The analog of the weight is the balance position of the weight 310 on the beam 312. The pacing analog is the moving of the weight 310 by motor 318 and the comparison of analog values is done by the contactor 328 and the partial slip rings 330 and 332.

It should be noted that although the examples used have been weight reduction or discharge, the control action will work equally well for filling the tanks at a constant rate of weight increase with respect to time.

In the claims the generic term system is used to describe any system or process, electrical, mechanical or chemical in nature, to which the techniques herein described may find application. Although the controller was described as applied to a specific application it is not intended that my invention be limited to this application for those skilled in the art may readily apply the principles herein described for time rate-of-change and rate-of-change of a rate-of change control to diverse problems in many fields.

Having thus described the invention, listed its advantages and illustrated its application, I claim:

1. Apparatus for maintaining a constant time rate-of-change in the weight of a tank of fluid wherein an adjustable valve is provided for varying the flow of fluid to or from the tank and a weighing device is provided for giving a continuous and instantaneously accurate measurement of the weight of the tank and fluid; comprising a synchronous motor operating from a power supply of constant frequency and rotating at a predetermined angular speed, a shaft carrying a cam follower in the form of a single-pole-double-throw switch means including a gear train and differential connecting the motor to the shaft, a cam disposed for action with said cam follower, means including a servo system interconnecting the weighing device and the cam for giving the cam an angular displacement which is an analog of the weight of the tank and fluid, a step in the cam actuating the switch of said cam follower, two reversible motors, means including said switch controlling the direction of rotation of each of the two reversible motors, the first of said motors driving through the differential to the cam follower shaft and the second of said motors simultaneously making changes in the adjustment of the valve, said last named means causing the two reversible motors to move in opposite directions with the cam follower moving closer to the cam and the valve changing the rate of discharge from the tank causing the cam to move in the direction of the follower.

2. Apparatus for maintaining a constant time rate-of-change in the weight of a tank of fluid wherein an adjustable valve is provided for varying the flow of fluid to or from the tank and a beam balance is provided for measurement of the weight of the tank and fluid; comprising means including a motor and gear train affixed to the beam balance for moving the balance weight along the beam at a constant velocity equivalent to the required rate-of-change in weight of the tank of fluid, means operatively connected to the beam and including a brush and partial slip rings for determining if and in which direction the beam is out of balance, means electrically connected to said brush and slip rings for automatically changing the velocity of movement of the balance weight a discrete amount and in such a direction to reset the beam in balance, and means operating simultaneously with the last named means and electrically connected to the brush and slip rings for adjusting the valve a discrete amount in such a direction that the time rate-of-change of weight of tank and fluid more closely matches the required rate-of-change.

3. Apparatus for maintaining a constant time rate-of-change in the weight of a tank of fluid wherein an adjustable valve is provided for varying the flow of fluid to or from the tank and a weighing device is provided for giving a continuous measurement of the weight of the tank and fluid which is instantaneously accurate; comprising means forming part of the weighting device for establishing an analog of the measurement which has the same time rate-of-change characteristics as the measurement, means including a constant speed motor providing a reference analog of the same type and scale as the measurement analog, said reference analog having the desired time rate-of-change, comparing means operatively connected to the two recited means for comparing the two analogs, reset means controlled by said comparing means for cumulatively combining successive discrete increments to the value of one of the analogs to keep its value equal to the other analog, additional means controlled by said comparing means and coupled to the reset means for adjusting the valve setting in discrete increments which are a function of the first recited discrete increments, said adjustments in the valve being made by differentially combining the current setting of the valve with the discrete increments so as to make the successive discrete increments approach zero and maintain the analog of the measurement continuously equal to the reference analog.

4. Apparatus for controlling the weight change of a tank of fluid as a function of a second derivative control pattern with respect to time wherein an adjustable valve is provided for varying the flow of fluid to or from the tank and a weighing device is provided for giving a continuous measurement of the weight of the tank and fluid which is instantaneously accurate; comprising means connected to the weighing device for establishing an analog of the measurement and which has the same time rate-of-change characteristic as the measurement, means independent of the weighing device providing a reference analog of the same type and scale as the measurement analog, said reference analog having the required second derivative control pattern, means connected to the two recited means for comparing the two analog values, means operatively connected to and controlled by said comparing means for automatically adding successive discrete increments of a magnitude proportional to the difference of the compared analogs to the value of one of the analogs to keep its value equal to the other analog, additional means also operatively connected to and controlled by said comparing means for adjusting the valve, the magnitude of said adjustments being a function of the magnitude of the discrete increments so as to make the succesive discrete increments approach zero and maintain the analog of the measurement continuously equal to the reference analog.

5. Apparatus for control of a system, wherein it is required to maintain a predetermined constant rate-of-change with respect to time of a variable of that system and first means are provided for physically changing in discrete steps a controlling factor which affects the rate-of-change of the variable, and second means are provided for giving a continuous measurement of the variable; comprising pacing means providing a reference analog having the desired rate-of-change, converting means connected to and controlled by the second means for changing the continuous measurement of the variable to an analog of the same type and scale as the reference analog and having identical rate-of-change characteristics to the variable, comparing means operatively connected to the pacing means and converting means for determining the direction of the difference between the two analog quantities, rest means connected to and controlled by the comparing means for automatically adding successive small additional changes to the value of the changing reference analog in such a direction as to keep its value equal to the value of the analog of the measurement, and adjusting means also connected to and controlled by the comparing means for automatically adjusting the first means to change in discrete steps the controlling factor, the magnitude of said steps being a function of the small changes provided by the last-named means and so related to said small changes as to cause the rate-of-change of the variable to hold the desired constant value.

6. Apparatus for control of a system, wherein it is required to program a rate-of-change of a rate-of-change of a variable in the system, the respective changes being made with respect to time, and first means are provided for physically changing in discrete steps a controlling factor which affects the rate-of-change of the variable, and second means are provided for giving a continuous measurement of the variable; comprising pacing means providing a reference analog which is programmed in time such as to duplicate the required program of the variable, converting means connected to the second means for changing the continuous measurement of the variable to an analog of the same type and scale as the reference analog and having identical rate-of-change characteristics to the variable, comparing means connected to the pacing means and converting means for determining the direction of the difference between the two analog quantities, reset means connected to and controlled by the comparing means for automatically adding successive small changes to the value of one of the analogs in such a direction as to keep its value equal to the value of the other analog, and adjusting means connected to and also controlled by the comparing means and operating simultaneously with the reset means for adjusting the first means to change in discrete steps the controlling factor, such steps being a function of the small changes provided by the reset means and so related to said small changes as to cause the rate-of-change of the variable to maintain the required program.

References Cited in the file of this patent

UNITED STATES PATENTS

| | | |
|---|---|---|
| 1,993,527 | Mears | Mar. 5, 1935 |
| 2,257,905 | Gorrie | Oct. 7, 1941 |
| 2,544,155 | Harkenrider | Mar. 6, 1951 |
| 2,636,642 | Gorin | Apr. 28, 1953 |
| 2,662,665 | Harper | Dec. 15, 1953 |
| 2,712,414 | Ziebolz et al. | July 5, 1955 |
| 2,718,982 | Long | Sept. 27, 1955 |
| 2,763,399 | Heacock | Sept. 18, 1956 |
| 2,796,197 | Griddle | June 8, 1957 |
| 2,842,311 | Petrie | July 8, 1958 |
| 2,925,197 | Krebel | Feb. 16, 1960 |